(12) United States Patent
Nelson

(10) Patent No.: US 6,381,352 B1
(45) Date of Patent: Apr. 30, 2002

(54) METHOD OF ISOLATING RELEVANT SUBJECT MATTER IN AN IMAGE

(75) Inventor: Susan R. Nelson, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/252,605

(22) Filed: Feb. 2, 1999

(51) Int. Cl.[7] .................................................. G06K 9/00
(52) U.S. Cl. ....................................... 382/132; 128/922
(58) Field of Search ................................. 382/128, 291, 382/131, 129, 132, 130; 378/156, 62; 600/408

(56) References Cited

U.S. PATENT DOCUMENTS

| | | | | |
|---|---|---|---|---|
| 4,922,543 A | * | 5/1990 | Ahlbom et al. ................ 382/48 |
| 5,278,887 A | * | 1/1994 | Chiu et al. ................... 378/156 |
| 5,452,367 A | * | 9/1995 | Bick et al. ................... 382/128 |
| 5,457,754 A | * | 10/1995 | Han et al. .................... 382/128 |
| 5,684,888 A | * | 11/1997 | Vuylsteke .................... 382/128 |
| 5,859,891 A | * | 1/1999 | Hibbard ........................ 378/62 |
| 6,058,322 A | * | 5/2000 | Nishikawa et al. .......... 600/408 |

* cited by examiner

*Primary Examiner*—Joseph Mancuso
*Assistant Examiner*—Abolfazl Tabatabai
(74) *Attorney, Agent, or Firm*—Harvey A. Gilbert; Donald G. Peck

(57) ABSTRACT

An image processing method improves contrast of relevant subject matter surrounded or partially bordered by a substantially homogeneous background. A first sub-image is defined that includes the relevant subject matter and a reduced amount of the substantially homogeneous background. A second sub-image is defined from the first sub-image that is substantially just the relevant subject matter. If any of the homogeneous background remains, a smoothing routine can be applied to the edges of the second sub-image. The second sub-image can then be re-scaled to a given dynamic range for improved contrast of the relevant subject matter.

28 Claims, 1 Drawing Sheet

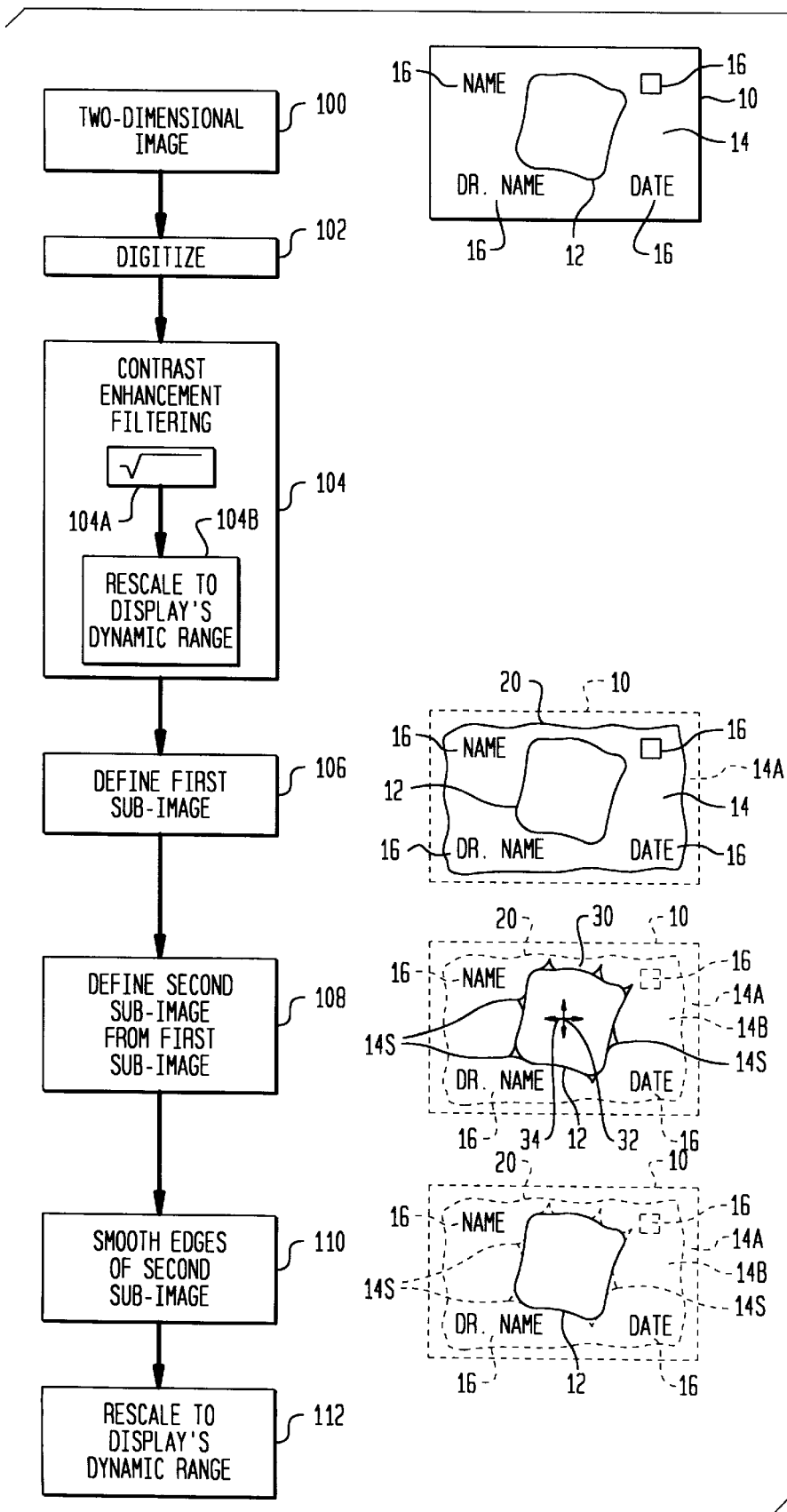

METHOD OF ISOLATING RELEVANT SUBJECT MATTER IN AN IMAGE

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to image processing, and more particularly to an image processing method that can isolate relevant subject matter from a substantially homogeneous background.

BACKGROUND OF THE INVENTION

In many fields, two-dimensional images of relevant subject matter are surrounded or at least partially bordered by a dark (i.e., black) homogenous background in which bright (i.e., white) labeling or artifacts are present due to imaging anomalies or errors, or to identify the subject matter, provide scaling information, time/date information, etc. Examples of such two-dimensional images include x-ray, mammographic, sonographic and sonar images. However, the dark background and bright labeling or artifacts use the lower and upper regions, respectively, of a display=s dynamic range. As a result, image contrast of the relevant subject matter is reduced because the relevant subject matter is not able to utilize the full dynamic range of the display. Reduced contrast of the relevant subject matter means that important details (e.g., tumor presence, bone fractures, fetal anomalies, etc., in the field of medicine; structural defects in the field of static structure analysis; and missed targets or other anomalies in sonar image analysis) could be overlooked or misread.

SUMMARY OF THE INVENTION

Accordingly, it is an object of the present invention to provide an image processing method that improves the image quality of relevant subject matter.

Another object of the present invention is to provide an image processing method that isolates the relevant subject matter of a two-dimensional image from a dark homogenous background which may incorporate bright labeling and/or artifacts.

Still another object of the present invention is to provide an image processing method that defines the boundaries of the relevant subject matter to improve computation speed for any post-processing.

Other objects and advantages of the present invention will become more obvious hereinafter in the specification and drawings.

In accordance with the present invention, an image processing method uses digital data representing grey scale values of a two-dimensional image of relevant subject matter and a substantially homogeneous background that at least partially borders on the relevant subject matter. A first sub-image is defined from the two-dimensional image. The first sub-image includes the relevant subject matter and a reduced amount of the substantially homogeneous background. A second sub-image is defined from the first sub-image. The second sub-image predominantly defines just the relevant subject matter. A smoothing routine can be applied to the second sub-image if any small areas of homogeneous background remain. The second sub-image can then be re-scaled to a given dynamic range for improved contrast of the relevant subject matter as compared to the initial image.

BRIEF DESCRIPTION OF THE DRAWINGS

The sole FIGURE is a flow diagram of the image processing method of the present invention and includes a corresponding schematic of a display that would be generated at each step of the method.

DETAILED DESCRIPTION OF THE INVENTION

Referring now to the sole FIGURE, a flow diagram of the image processing method of the present invention is illustrated on the left and the state of the processed image is illustrated on the right. It is to be understood that the present invention can be used to isolate relevant subject matter of any two-dimensional image when the relevant subject matter is surrounded or partially bordered by a substantially homogenous background. Typically, the homogenous background is very dark or black (i.e., 0 on a display=s grey scale) as is the case with x-ray, mammographic, sonographic or sonar images. While not a requirement, the dark homogenous background frequently supports reversed-out or bright white (e.g., Z on a display grey scale that ranges from 0–Z) labeling or other artifacts. Typical image displays are 8-bit, i.e., grey scale values of each pixel can range from 0–255, as this is about the limit that the human eye can resolve.

The relevant subject matter typically is comprised of grey scale levels falling between the black background and the bright white labeling and artifacts. For example, the relevant subject matter for 8-bit mammogram generally has grey scale values in the range of 50–240 with background regions having grey scale values from 0–50 and labeling/artifacts having grey scale values over 240. To allow for improved analysis of the relevant subject matter, the present invention isolates the relevant subject matter from the homogenous background and the labeling or artifacts. In this way, the relevant subject matter can be stretched or re-scaled to the full dynamic range capability of a display.

In the figure, a two-dimensional image is illustrated generally by reference numeral 10. By way of example, it will be assumed that image 10 is an x-ray image that includes a regularly or irregularly shaped area of relevant subject matter 12, a dark background region 14 that is substantially homogenous in terms of its grey scale level, and bright white labeling or artifacts 16 that appear in background region 14. Background region 14 will appear black and lableing or artifacts 16 will apeear white. Note that the boundary between subject matter 12 and background region 14 need not (and typically is not) sharply defined as illustrated, but rather rolls off in terms of grey scale level as is known in the art. That is, the boundary between relevant subject matter 12 and background region 14 transitions to the grey scale level of background region 14 over a number of pixels. The range of grey scale values defining the transition from relevant subject matter 12 to background region 14 must be determined (e.g., using histograms) for the type of data that will be processed. For example, 8-bit mammogram data transitions to background in the range of 3–6% of the maximum grey scale value of 255. In other words, the edge of the relevant subject matter of an 8-bit mammogram image ranges in grey scale value from approximately 8 to approximately 15.

At block 100, image 10 is made available for processing in accordance with the present invention. If not already in digital form, image 10 is digitized at block 102. Each piece or pixel of resulting digital data represents a grey scale level where a grey scale value of 0 represents black and the maximum grey scale value will represent white.

The resulting digital data can be optionally filtered at block 104 to improve contrast of the raw digital data. For example, if image 10 is very dark, it may be beneficial to take the square root of each piece of digital data (i.e., the grey scale value) at block 104A and then re-scale the data at block 104B up to the full dynamic range of a display (not shown) to be used for viewing. Note that by taking the square root, no data is lost. Images that are not that dark may only require re-scaling at block 104B. Re-scaling can involve scaling up or down to the display's dynamic range depending on the image data resolution. Further, other types of contrast enhancing filtering could also be used.

At block 106, the digitized and filtered image data is processed to define a first sub-image 20 (shown adjacent to block 106) such that the amount of background region 14 is reduced (i.e., excluded from further processing) by the area 14A between first sub-image 20 and image 10, the outside edge of which being illustrated in dashed-line form. Note that although background region 14 is shown as being reduced on all four sides, this need not be the case and will depend on the specifics of image 10 as will become apparent from the following description.

To define first sub-image 20 at block 106, it is first necessary to provide a threshold grey scale level that, at or below which, will define background region 14 for the human eye=s level of perception. For example, for a display having a 256-bit grey scale dynamic range, grey scale values from 0 to approximately 50 are perceived by the human eye as black. In general, approximately the first 20% of a display's dynamic range is perceived by the human eye as black. Thus, in the case of 8-bit mammogram data, the threshold grey scale level could be set to 50 or approximately 20% of the maximum grey scale level.

Starting at the outside edge of image 10, the particular threshold grey scale level is compared with the digital data comprising image 10 in order to define the outer edge boundary of first sub-image 20, i.e., the points at which grey scale values of the image first exceed the threshold grey scale values. This involves scanning the rows and/or columns of image 10 starting at the first and last data points for a row/column and stepping inward toward the central portion of image 10. Note that outside edge boundary portions of first sub-image 20 can be, but need not be, defined at an edge of a label or artifact 16.

In order to better isolate relevant subject matter 12, it is necessary to eliminate more of background region 14 as well as labeling or artifacts 16. To do this, the digital data comprising first sub-image 20 is further processed at block 108 to define a second sub-image 30 which is illustrated adjacent to block 108. Second sub-image 30 is a subset of sub-image 20 that has a further reduced amount of background region 14 surrounding (or just partially bordering as the case may be) relevant subject matter 12. That is, reduced background region 14A is further reduced by the area 14B between first sub-image 20 and second sub-image 30. Note that area 14B also encompasses labeling or artifacts 16.

To accomplish the function of block 108, it is first necessary to define a position (e.g., coordinate, a line defined by several row or column coordinates, etc.) that falls within relevant subject matter 12. This position is illustrated in second sub-image 30 as position 32. While position 32 can be selected in a variety of ways, the center of image 10 is generally a good choice as some portion of relevant subject matter 12 will typically traverse the center of image 10. However, if the relevant subject matter is skewed off-center in the image, various image data points can be tested until a position within the relevant subject matter is defined. With position 32 defined, it is also necessary to define grey scale value(s) indicative of the outer edge boundary of relevant subject matter 12. As mentioned above, the transition between relevant subject matter 12 and background region 14 need not be a sharp transition and typically rolls off over a plurality of pixels. For example, in 8-bit mammographic images, the roll off occurs over a range of approximately 3–6% of the maximum dynamic range, i.e., the roll off range is approximately equal to grey scale values from 8 to 15.

Starting at position 32, the particular roll off range just described is compared with the digital data comprising first sub-image 20 in order to define the outer edge boundary of second sub-image 30, i.e., the points at which grey scale values of the image first fall within the roll off range. This involves scanning outward from position 32 along rows and/or columns as indicated by arrows 34. As the outer edge of relevant subject matter 12 is encountered, grey scale values quickly drop into the roll off range to define the outer edge boundary of second sub-image 30.

Second sub-image 30 is predominantly just relevant subject matter 12, but can still include a small amount of background region 14. Generally, any of background region 14 associated with second sub-image 30 is in the form of jumps or spikes 14S. Accordingly, if second sub-image 30 has spikes 14S, elimination thereof can be achieved by applying a smoothing routine to second sub-image 30 at block 110. By way of example, a simple smoothing routine that works well examines a grey scale value difference between adjacent points forming the edges of second sub-image 30. If the difference is too large, the last data point falling within tolerance is used.

In terms of components for carrying out the present invention, block 100 could be a database and block 102 could be an analog-to-digital converter. Blocks 104, 106, 108, 110 and 112 could be realized by a processor.

The advantages of the present invention are numerous. With background region 14 and labeling or artifacts 16 eliminated from consideration, relevant subject matter 12 can be re-scaled or stretched at block 112 to the full dynamic range of a display. As a result, contrast of relevant subject matter 12 is greatly enhanced to permit improved analysis thereof. Another benefit is that relevant subject matter 12 represents a greatly reduced data set which can be processed faster than the entire image data set comprising image 10. This is important when working with very large image data sets having 12 or 16-bit resolution where any economy in computation saves both time and money.

Although the invention has been described relative to a specific embodiment thereof, there are numerous variations and modifications that will be readily apparent to those skilled in the art in light of the above teachings. For example, the comparisons performed at blocks 106 and 108 can be done on a "pixel-by-pixel" basis for greatest accuracy. However, for more regularly-shaped relevant subject matter, it may be sufficient to skip one or more pixels at each comparison in order to speed up the image processing of the present invention. Various smoothing routines can be applied to the data at block 110. Further, processing can be tailored for specific types of relevant subject matter that always exhibit the same trait, e.g., a straight edge boundary, a specific threshold grey scale value or roll off range, etc. It is therefore to be understood that, within the scope of the appended claims, the invention may be practiced other than as specifically described.

What is claimed as new and desired to be secured by Letters Patent of the United States is:

1. An image processing method comprising the steps of:
   providing digital data representing grey scale values of a two-dimensional image of relevant subject matter and a substantially homogeneous background that at least partially borders on said relevant subject matter, wherein said grey scale values range from 0 to Z where 0 equals black and Z equals white;
   providing a threshold grey scale level between 0 and Z;
   comparing said threshold grey scale level to said digital data starting at outer edges of said two-dimensional image and moving inward therefrom to define an outer edge boundary of a first sub-image of said two-dimensional image at which said digital data first becomes greater than said threshold grey scale level, said first sub-image including said relevant subject matter and a reduced amount of said substantially homogeneous background; and
   defining a second sub-image from said first sub-image, said second sub-image substantially defining just said relevant subject matter.

2. An image processing method according to claim 1 wherein said step of providing digital data comprises the steps of:
   providing analog data representing said two-dimensional image; and
   digitizing said analog data to generate said digital data.

3. An image processing method according to claim 1 further comprising the step of filtering said digital data to enhance contrast of said two-dimensional image prior to said step of defining said first sub-image.

4. An image processing method according to claim 3 wherein said step of filtering comprises the step of re-scaling said digital data to a given dynamic range.

5. An image processing method according to claim 3 wherein said step of filtering comprises the steps of:
   taking the square root of each of said grey scale values to generate square root digital data; and
   re-scaling said square root digital data to a given dynamic range.

6. An image processing method according to claim 1 wherein said grey scale values range from 0 to Z where 0 equals black and Z equals white, and wherein said step of defining said second sub-image comprises the steps of:
   providing a range of said grey scale values indicative of said substantially homogeneous background;
   defining a position in said first sub-image that falls within said relevant subject matter; and
   comparing said range to said digital data starting at said position in said first sub-image and moving outward therefrom to define an outer edge boundary of said second sub-image image at which said digital data first falls within said range.

7. An image processing method according to claim 6 wherein said two-dimensional image is a mammogram and wherein said range is approximately equal to 3–6% of Z.

8. An image processing method according to claim 1 further comprising the step of re-scaling said second sub-image to a given dynamic range.

9. An image processing method according to claim 1 wherein said second sub-image includes said relevant subject matter and a further reduced amount of said substantially homogeneous background that is less than said reduced amount in said first sub-image, said method further comprising the step of applying a smoothing routine to edges of said second sub-image.

10. An image processing method for isolating relevant subject matter from a substantially homogeneous background, comprising the steps of:
    providing digital data representing grey scale values of a two-dimensional image of relevant subject matter and a substantially homogeneous background that at least partially borders on said relevant subject matter, wherein said grey scale values range from 0 to Z where 0 equals black and Z equals white;
    providing a threshold grey scale level between 0 and Z;
    comparing said threshold grey scale level to said digital data starting at outer edges of said two-dimensional image and moving inward therefrom to define an outer edge boundary of a first sub-image at which said digital data first becomes greater than said threshold grey scale level, said first sub-image including said relevant subject matter and a reduced amount of said substantially homogeneous background;
    providing a range of said grey scale values indicative of said substantially homogeneous background;
    defining a position in said first sub-image that falls within said relevant subject matter; and
    comparing said range to said digital data starting at said position in said first sub-image and moving outward therefrom to define an outer edge boundary of a second sub-image at which said digital data first falls within said range, said second sub-image substantially defining just said relevant subject matter.

11. An image processing method according to claim 10 wherein said step of providing digital data comprises the steps of:
    providing analog data representing said two-dimensional image; and
    digitizing said analog data to generate said digital data.

12. An image processing method according to claim 10 further comprising the step of filtering said digital data to enhance contrast of said two-dimensional image prior to said step of comparing said threshold grey scale level to said digital data.

13. An image processing method according to claim 12 wherein said step of filtering comprises the step of re-scaling said digital data to a given dynamic range.

14. An image processing method according to claim 12 wherein said step of filtering comprises the steps of:
    taking the square root of each of said grey scale values to generate square root digital data; and
    re-scaling said square root digital data to a given dynamic range.

15. An image processing method according to claim 10 wherein said two-dimensional image is a mammogram and wherein said threshold grey scale level is approximately equal to 20% of Z.

16. An image processing method according to claim 10 wherein said two-dimensional image is a mammogram and wherein said range is approximately equal to 3–6% of Z.

17. An image processing method according to claim 10 further comprising the step of re-scaling said second sub-image to a given dynamic range.

18. An image processing method according to claim 10 wherein said second sub-image includes said relevant subject matter and a further reduced amount of said substantially homogeneous background that is less than said reduced amount in said first sub-image, said method further comprising the step of applying a smoothing routine to edges of said second sub-image.

19. An image processing method comprising the steps of:

providing digital data representing grey scale values of a two-dimensional image of relevant subject matter and a substantially homogeneous background that at least partially borders on said relevant subject matter, wherein said grey scale values range from 0 to Z where 0 equals black and Z equals white;

defining a first sub-image from said two-dimensional image, said first sub-image including said relevant subject matter and a reduced amount of said substantially homogeneous background;

providing a range of said grey scale values indicative of said substantially homogeneous background;

defining a position in said first sub-image that falls within said relevant subject matter; and comparing said range to said digital data starting at said position in said first sub-image and moving outward therefrom to define an outer edge boundary of a second sub-image at which said digital data first falls within said range, said second sub-image substantially defining just said relevant subject matter.

20. An image processing method according to claim 19 wherein said step of providing digital data comprises the steps of:

providing analog data representing said two-dimensional image; and digitizing said analog data to generate said digital data.

21. An image processing method according to claim 19 further comprising the step of filtering said digital data to enhance contrast of said two-dimensional image prior to said step of defining said first sub-image.

22. An image processing method according to claim 21 wherein said step of filtering comprises the step of re-scaling said digital data to a given dynamic range.

23. An image processing method according to claim 21 wherein said step of filtering comprises the steps of:

taking the square root of each of said grey scale values to generate square root digital data; and re-scaling said square root digital data to a given dynamic range.

24. An image processing method according to claim 19 wherein said grey scale values range from 0 to Z where 0 equals black and Z equals white, and wherein said step of defining said first sub-image comprises the steps of:

providing a threshold grey scale level between 0 and Z; and comparing said threshold grey scale level to said digital data starting at outer edges of said two-dimensional image and moving inward therefrom to define an outer edge boundary of said first sub-image at which said digital data first becomes greater than said threshold grey scale level.

25. An image processing method according to claim 24 wherein said two-dimensional image is a mammogram and wherein said threshold grey scale level is approximately equal to 20% of Z.

26. An image processing method according to claim 19 wherein said two-dimensional image is a mammogram and wherein said range is approximately equal to 3–6% of Z.

27. An image processing method according to claim 19 further comprising the step of re-scaling said second sub-image to a given dynamic range.

28. An image processing method according to claim 19 wherein said second sub-image includes said relevant subject matter and a further reduced amount of said substantially homogeneous background that is less than said reduced amount in said first sub-image, said method further comprising the step of applying a smoothing routine to edges of said second sub-image.

\* \* \* \* \*